Sept. 28, 1948.   O. C. WILSON ET AL   2,450,324
APPARATUS FOR COILING THERMOPLASTIC MATERIAL
Filed July 7, 1945

INVENTOR.
ORAN C. WILSON and
BY PHILIP S. BRITTON

ATTORNEYS

Patented Sept. 28, 1948

2,450,324

UNITED STATES PATENT OFFICE 2,450,324

APPARATUS FOR COILING THERMO-PLASTIC MATERIAL

Oran C. Wilson, Lakewood, and Philip S. Britton, Bratenahl, Ohio

Application July 7, 1945, Serial No. 603,704

2 Claims. (Cl. 18—19)

This invention relates to apparatus for shaping strips of extruded thermo-plastic material into coil form. Thermo-plastic material, such as cellulose acetate, can be used in many ways when wound spirally into a coil having a single layer of turns. The difficulty, however, has been to shape the material while it is still plastic enough to be formed, and at a rate that would be commensurate with that at which the material is being extruded.

An object of the present invention is to provide apparatus by means of which thermoplastic material may be extruded from a machine which operates at the normal extruding rate, and which will automatically wind the strip into a single layer spiral coil form, whereby predetermined lengths thereof may be periodically cut off without disturbing the continuity of the extruding and coiling operations.

An additional object is to devise apparatus by means of which the coiling of the thermoplastic material occurs automatically, so that the attention of only one operator is required for periodically cutting off the coils to the desired lengths.

Figure 1:
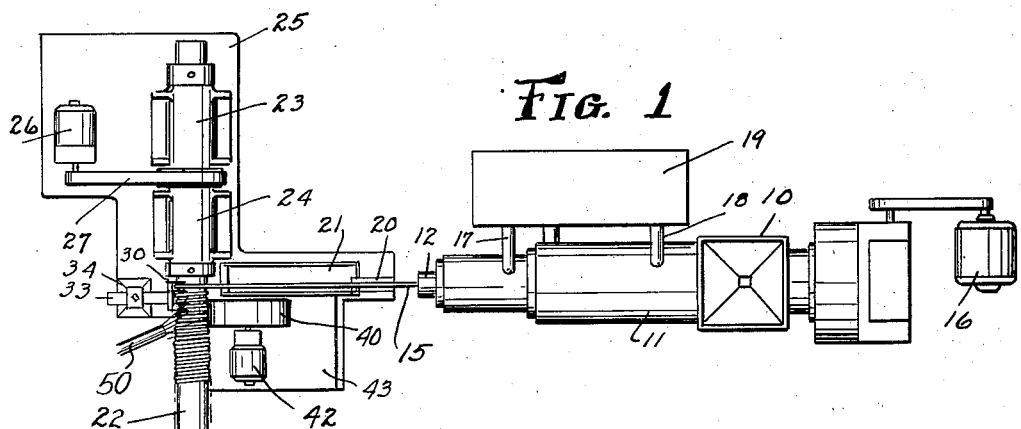
Figure 3:
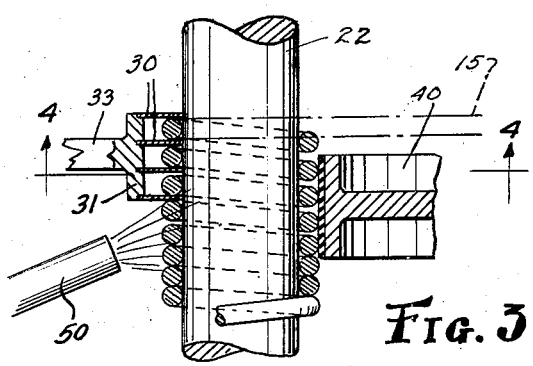
Figure 4:
Figure 2:
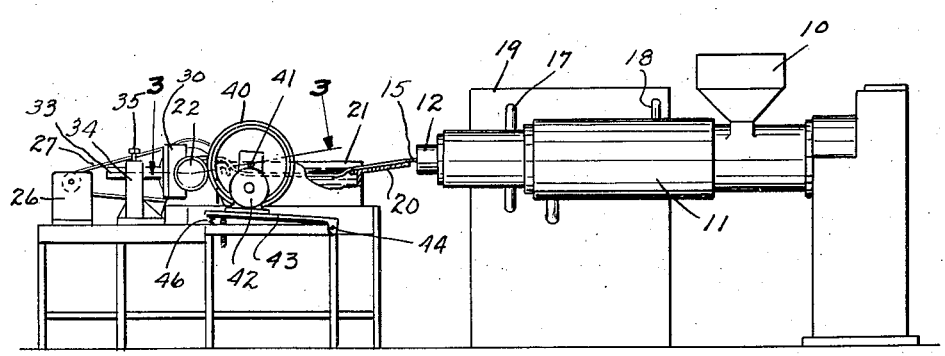

Referring now to the drawings, Fig. 1 is a top plan view of an apparatus embodying the present invention; Fig. 2 is a side view of the extruding and coiling apparatus shown in Fig. 1; Fig. 3 is a section taken on the line 3—3 in Fig. 2, and Fig. 4 is a section taken on the plane indicated by the line 4—4 in Fig. 3.

In Figs. 1 and 2, we have illustrated the usual extruding machine which includes a hopper 10 into which the thermoplastic material in powder form may be fed into a chamber within a casing 11 from which it is extruded in a continuous process through a head 12 into strip form indicated at 15. The material is moved lengthwise of the casing 11 by means of the customary screw type conveyor (not shown) which is rotated by means of an electric motor 16. Additionally, the material flowing in the casing 11 may be heated to a plastic condition by utilizing the customary jacketed casing to which steam may be supplied through conduits 17 and 18 from a source of steam supply indicated in general at 19.

As the material in plastic form leaves the extruding machine, it is passed across a table 20 and into a bath 21 of water, where it is pre-set and rendered sufficiently rigid to be passed onto a mandrel 22. A permanent set is not given to the material until it is wound on the mandrel. The mandrel is mounted for rotation in bearings 23 and 24 that are supported upon a table 25. An electric motor 26 serves to rotate the mandrel through a belt drive 27. The mandrel thus projects beyond the bearing 24 and has the free end 28 thereof unsupported, whereby the thermoplastic material in coil form may be slid off the free end of the mandrel when cut to the desired length.

We have found that the coiling of the material can be accomplished by the use of spacing members 30 which are disposed between the first few turns of the material upon the mandrel. Each spacing member comprises a thin blade of approximately one-eighth inch in thickness for use on a mandrel having a diameter of two and one-half inches. The blades are attached to a holder 31 and are disposed in parallel relationship and spaced apart a distance sufficiently to accommodate the cross sectional dimension of the material being coiled. Each blade has a recess 32 that is shaped to be complementary to the curvature of the mandrel and the holder is adjusted radially of the mandrel to leave a slight clearance between each blade and the outer surface of the mandrel, as is shown for example in Fig. 4. For this purpose the holder has a shank 33 that is supported by a bracket 34 on the table 25. The position of the holder may be fixed by an adjusting screw 35, as shown in Fig. 2.

In addition to the spacing members as aforesaid, we cause pressure to be exerted against a portion of the coil, and for accomplishing such purpose we utilize a wheel 40 which rotates in a direction opposite to that of the mandrel as is shown by the arrows in Fig. 4. The pressure wheel is mounted for rotation upon a shaft 41 which in turn is adapted to be driven by an electric motor 42. In the preferred arrangement, the motor and wheel are supported as a unit upon a platform 43 which is pivoted at 44 to the table 25. A spring 46 supports the free end of the platform and enables the degree of the pressure of the roll against the material to be yieldingly maintained.

In the preferred arrangement, the wheel 40 impinges upon about four turns of the coil and preferably at least two of such turns are within the confines or control of the spacing members 30. Additionally, the wheel 40 may be caused to have a surface speed faster than the rate at which the material is being fed onto the mandrel, so as thereby to tighten the coil along a short portion thereof at about the time it leaves the control of the spacing members.

We have found that satisfactory results may be obtained by using a mandrel having a diameter of two and one-half inches on thermoplastic material having a circular cross sectional shape of five-sixteenths inch in diameter if the plastic material is fed onto the mandrel at about twenty-five feet per minute, and if the surface speed of the roll 40 is substantially thirty-five feet per minute. The speed of the latter, however, may be varied to approximately the speed of the material on some sizes of material. For such size of thermoplastic strip, the temperature of the water in the cooling bath 21 is substantially 100° F.

The coiling of the material continues progressively and the coils may be cut off in convenient lengths intermediately of the length of the mandrel without interfering with the continuity of the extruding and coiling operations. The material is given a permanent set during the coiling operation by spraying water thereon from the customary cold water service conduit, indicated at 50, but preferably the first turn should be substantially completed before the water is applied thereto.

A coil formed in accordance with the present invention will be uniform in diameter throughout its length and will be suitable for cutting into circular sections for subsequent treatment in the manufacture of articles of commerce. The invention is advantageous in that it permits the coiling to be performed while the material is still soft enough to be shaped and yet keeps the coils moving along the mandrel to avoid interference between contiguous turns resulting from an extension of the turns to the full length of the mandrel. The invention has thus solved a difficult problem in the plastic forming art.

We claim:

1. Apparatus for making a coil of thermoplastic material comprising, means for extruding the thermoplastic in heated condition to form a strip, a rotating mandrel onto which the strip is fed, a plurality of spaced parallel stationary plates having circular segmental portions adapted to extend partially around the mandrel, the plates being spaced apart sufficiently to accommodate a single turn of the strip between adjacent plates, and the space opposite the first pair of plates being open for admission of the material, a roller adapted to engage and to exert pressure upon the first few turns of the coil, said roller being disposed opposite some of said plates and means for rotating the roller independently of the mandrel.

2. Apparatus for forming a continuous rod-like strip of thermoplastic material into a spiral coil comprising, means for extruding the material in a flowable condition into a continuous elongated rod-like strip, means for coiling said strip, said means including a rotating mandrel, a controlling device comprising a plurality of spaced plates having circular segmental recesses therein extending around a portion of the mandrel, said plates being spaced apart sufficiently to accommodate one turn of the coil between adjacent plates, a pressure roller acting upon a plurality of turns of the coil on the side of the mandrel opposite the plates, at least one of said turns being partially within said controlling device and another of said turns being beyond said controlling device, a cooling means acting on the turns after they leave the controlling device, and means for rotating the roller independently of the mandrel and in a direction opposite to that of the mandrel.

ORAN C. WILSON.
PHILIP S. BRITTON.

REFERENCES CITED

The following references are of record in the file of this patent:

UNITED STATES PATENTS

| Number | Name | Date |
|---|---|---|
| 372,423 | Mallet-Guy | Nov. 1, 1887 |
| 644,421 | Graham | Feb. 27, 1900 |
| 1,395,190 | Lamb | Oct. 25, 1921 |
| 2,388,401 | Freundlich | Nov. 6, 1945 |
| 2,393,058 | Pierce et al. | Jan. 15, 1946 |